United States Patent
Shinagawa

(10) Patent No.: US 9,238,471 B2
(45) Date of Patent: Jan. 19, 2016

(54) METHOD FOR CONTROL OF VEHICLE BODY TILTING OF RAILWAY VEHICLE

(75) Inventor: Daisuke Shinagawa, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 197 days.

(21) Appl. No.: 14/008,198

(22) PCT Filed: Mar. 6, 2012

(86) PCT No.: PCT/JP2012/001514
§ 371 (c)(1),
(2), (4) Date: Sep. 27, 2013

(87) PCT Pub. No.: WO2012/132240
PCT Pub. Date: Oct. 4, 2012

(65) Prior Publication Data
US 2014/0020595 A1    Jan. 23, 2014

(30) Foreign Application Priority Data
Mar. 31, 2011    (JP) .................................. 2011-079326

(51) Int. Cl.
| | |
|---|---|
| *B61F 5/10* | (2006.01) |
| *B61F 5/22* | (2006.01) |
| *B60T 13/68* | (2006.01) |
| *B60T 17/18* | (2006.01) |
| *B60T 17/02* | (2006.01) |

(52) U.S. Cl.
CPC .................. *B61F 5/22* (2013.01); *B60T 13/683* (2013.01); *B60T 17/02* (2013.01); *B60T 17/18* (2013.01); *B61F 5/10* (2013.01)

(58) Field of Classification Search
CPC ................ B61F 5/10; B61F 5/22; B61F 5/24; B60G 17/015; B60G 17/052; B60G 2400/51222; B61H 13/00; B60T 17/00; B60T 17/02; B60T 17/06; B60T 13/683; B60T 17/18
USPC .......... 105/199.2, 199.1, 453; 303/10; 701/37; 280/124.157, 5.5
See application file for complete search history.

(56) References Cited

U.S. PATENT DOCUMENTS

| | | | | |
|---|---|---|---|---|
| 3,757,702 | A * | 9/1973 | Kreissig et al. ............... | 105/210 |
| 2005/0010344 | A1* | 1/2005 | Misawa ......................... | 701/37 |
| 2009/0155106 | A1* | 6/2009 | Maloney et al. .............. | 417/442 |

FOREIGN PATENT DOCUMENTS

| | | |
|---|---|---|
| JP | 05-238387 | 9/1993 |
| JP | 2008-254577 | 10/2008 |

* cited by examiner

*Primary Examiner* — Mark Le
(74) *Attorney, Agent, or Firm* — Clark & Brody

(57) ABSTRACT

Control of vehicle body tilting when a railway vehicle travels along a curve includes: detecting a pressure of compressed air in an air tank; driving a compressor that supplies compressed air to the tank when detecting a pressure drop in the tank to or below a first threshold level $P_1$ in association with introduction of compressed air into air springs; and limiting the amount of compressed air to be introduced from the tank into the springs to a level equal to or lower than the amount of compressed air to be supplied from the compressor to the tank while continuing the introduction from the tank into the springs. This ensures that the tank pressure is maintained at a level equal to or higher than a minimum level required for braking actuation of the railway vehicle to have ride comfort when traveling along a curve and without causing braking trouble.

6 Claims, 2 Drawing Sheets

METHOD FOR CONTROL OF VEHICLE BODY TILTING OF RAILWAY VEHICLE

TECHNICAL FIELD

The present invention relates to a method for control of vehicle body tilting of a railway vehicle, designed to tilt a vehicle body supported by air springs on a bogie when it travels along a curve.

BACKGROUND ART

A railway vehicle includes a vehicle body and a bogie, and the vehicle body is supported on the bogie via a pair of left and right air springs. In general, when a railway vehicle which travels at high speed such as a Shinkansen "bullet train" travels along a curve, centrifugal force acts to make passengers feel uncomfortable. To improve ride comfort, control of vehicle body tilting is performed by introducing compressed air into the air spring on the outer rail side to tilt the vehicle body toward the inner rail side with respect to the bogie (see Patent Literatures 1 and 2, for example). Vehicle body tilting is carried out by means of compressed air stored in an air tank as a power source. The compressed air is produced by a compressor and supplied to the air tank.

In general, compressed air in the air tank is used as a power source for various pneumatic devices installed in a railway vehicle. In particular, it is used as a power source for a braking system. Thus, from a safety perspective, excessive decrease of the pressure of compressed air in the air tank (hereinafter also referred to as "air tank pressure") must be avoided.

However, when vehicle body tilting is carried out on consecutive curved sections, a significant amount of compressed air is consumed in the air tank. This causes an excessive decrease in the air tank pressure, which may lead to trouble with braking actuation. Because of this, conventional methods for control of vehicle body tilting are designed to forcibly stop the vehicle body tilting even while traveling along a curve if the air tank pressure falls to or below a prescribed level.

CITATION LIST

Patent Literature

PATENT LITERATURE 1: Japanese Patent Application Publication No. H05-238387
PATENT LITERATURE 2: Japanese Patent Application Publication No. 2008-254577

SUMMARY OF INVENTION

Technical Problem

If vehicle body tilting is stopped when the air tank pressure falls to or below a prescribed level as described above, the compressed air in the air tank is no longer consumed, and therefore no trouble occurs with braking actuation. However, the stopping of the vehicle body tilting causes the vehicle body to shift to the state of not being tilted with respect to the bogie, i.e., having a tilt angle of zero though it is traveling along a curve. This results in the problem of a significant deterioration in ride comfort.

The present invention has been made in view of the foregoing problem, and has as its object to provide a method for control of vehicle body tilting of a railway vehicle capable of inhibiting a deterioration in ride comfort when it travels along a curve without causing trouble with braking actuation.

Solution to Problem

As a result of intense study and research to achieve the object, the present inventors have made the following findings. When the air tank pressure falls to or below a prescribed level during traveling along a curve, compressed air may be supplied by driving a compressor to the air tank in which pressure has been reduced. At the same time, the amount of compressed air to be introduced from the air tank into the air springs may be limited to a level equal to or lower than the amount of compressed air to be supplied by the compressor so as to reduce the tilt angle of the vehicle body. This allows reduction of consumption of the compressed air in association with the vehicle body tilting, and thus eliminates the need to stop vehicle body tilting.

As a result of these, the deterioration in ride comfort can be inhibited because vehicle body tilting is carried out anyway although the tilt angle of the vehicle body is allowed to be decreased. Moreover, while the consumption of the compressed air in association with the vehicle body tilting is reduced, a greater amount of compressed air than the consumed amount is supplied from the compressor to the air tank. This ensures that the air tank pressure is maintained at a level equal to or higher than a minimum level required for braking actuation, and thus no trouble occurs with braking actuation.

The present invention has been accomplished based on the above findings, and the summaries thereof are set forth below relating to a method for control of vehicle body tilting of a railway vehicle. That is, there is provided a method for control of vehicle body tilting of a railway vehicle to tilt a vehicle body by introducing compressed air from an air tank into a pair of left and right air springs supporting the vehicle body on a bogie when the railway vehicle travels along a curve, the method comprising: detecting pressure of compressed air in the air tank; driving a compressor that supplies compressed air to the air tank when detecting a pressure drop in the air tank to or below a first threshold level in association with introduction of compressed air into the air springs; and limiting an amount of compressed air to be introduced from the air tank into the air springs to a level equal to or lower than an amount of compressed air to be supplied from the compressor to the air tank while continuing the introduction from the air tank into the air springs so as to ensure that the air tank pressure is maintained at a level equal to or higher than a minimum level required for braking actuation of the railway vehicle.

The above method for control of vehicle body tilting may preferably include: discontinuing the driving of the compressor when detecting a pressure increase in the air tank to or above a second threshold level, which is greater than the first threshold level, in association with the supply of compressed air by the compressor while imposing a limitation on the amount of compressed air to be introduced into the air springs; and lifting the limitation on the amount of compressed air to be introduced to the air springs.

In the above method for control of vehicle body tilting, the first threshold level $P_1$ may be specified by the equation (1) below and the second threshold level $P_2$ may be specified by the equation (2) below, each as an absolute pressure:

$$P_1 = P_0 + \gamma \times Pm \times k \times A/V \times T \tag{1}$$

$$P_2 = P_0 + \gamma \times Pm \times k \times A/V \times T + \gamma \times Pm \times A/V \times T \tag{2}$$

where $P_0$: a minimum air tank pressure required for braking actuation [kPa],

γ: a polytropic index,

Pm: a mean value of the air tank pressure [kPa], k: a correction coefficient; <B/A, B: the amount of compressed air to be supplied from the compressor to the air tank [m³/s], A: the amount of compressed air to be introduced from the air tank into the air springs with no limitation imposed thereon [m³/s], V: volume of the air tank [m³], and T: time lag between a start of driving of the compressor and a start of discharge of compressed air [s].

Advantageous Effects of Invention

According to the method for control of vehicle body tilting of the present invention, when the air tank pressure falls to or below a prescribed level during traveling along a curve, a compressor is driven and at the same time the amount of compressed air to be introduced into the air springs is limited to a level equal to or lower than the amount of compressed air to be supplied from the compressor. This can inhibit a deterioration in ride comfort because vehicle body tilting is carried out anyway although the tilt angle of the vehicle body is decreased. What is more, since a greater amount of compressed air than the consumed amount is supplied from the compressor to the air tank, it is possible to ensure that the air tank pressure is maintained at a level equal to or higher than a minimum level required for braking actuation of the railway vehicle and thus no trouble occurs with braking actuation.

DESCRIPTION OF EMBODIMENTS

Hereinafter, embodiments of the method for control of vehicle body tilting of a railway vehicle of the present invention are described in detail.

1. Configuration of railway vehicle

Figure 1:
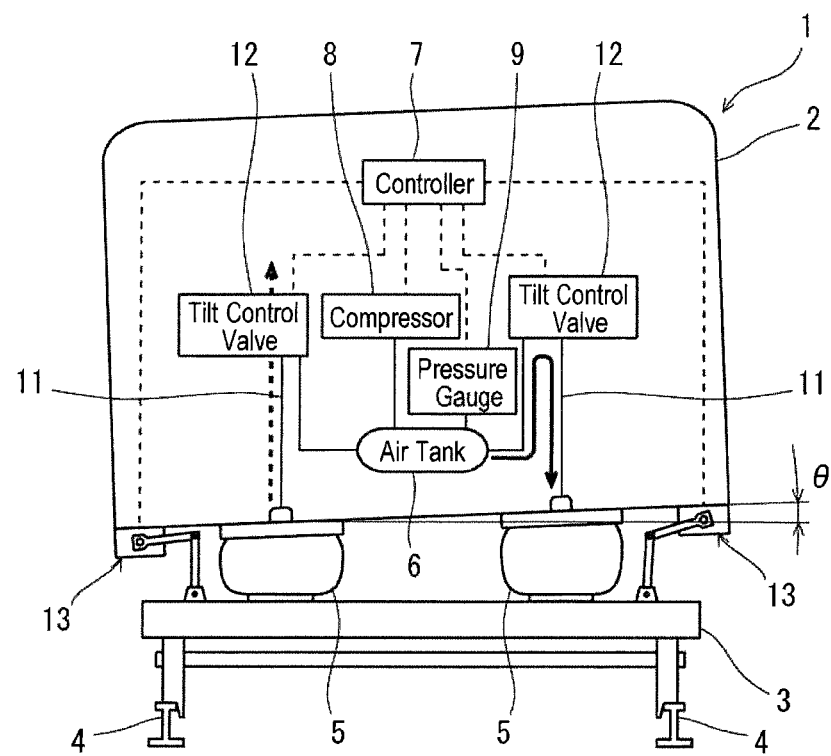
FIG. 1 is a schematic diagram illustrating a configuration example of a railway vehicle equipped with a vehicle body tilting device that can implement the method for control of vehicle body tilting of the present invention.

FIG. 1 is a schematic diagram illustrating a configuration example of a railway vehicle equipped with a vehicle body tilting device that can implement the method for control of vehicle body tilting of the present invention. FIG. 1 shows a railway vehicle under vehicle body tilting operation while traveling along a curve.

A railway vehicle 1 includes a vehicle body 2 and a bogie 3 that supports the vehicle body 2 in front and behind, and travels on rails 4. The vehicle body 2 is elastically supported by a pair of left and right air springs 5 which are interposed between the bogie 3 and the vehicle body 2. The railway vehicle 1 includes a vehicle body tilting device for tilting the vehicle body 2 with respect to the bogie 3 in order to tilt the vehicle body 2 toward the inner rail side when it travels along a curve.

As the vehicle body tilting device, a tilt control valve 12 is disposed in the path of pneumatic piping 11, which is arranged to extend from an air tank 6 to air springs 5. The tilt control valve 12 is connected to a controller 7 and operates in response to commands from the controller 7.

The air tank 6 is provided with a compressor 8 coupled thereto. The compressor 8 produces compressed air and supplies it to the air tank 6. The compressor 8 operates in response to commands from the controller 7. The air tank 6 is also provided with a pressure gauge 9. The pressure gauge 9 detects the pressure of compressed air stored in the air tank 6, i.e., air tank pressure, and transmits the detected signals to the controller 7. The air tank 6 as referred to herein includes a main tank, which is directly coupled to the compressor 8 and independently stores the compressed air, as well as an auxiliary tank for dedicated use in vehicle body tilting.

Also, an air spring height detection sensor 13 is disposed between the vehicle body 2 and the bogie 3, on both left and right sides, to detect the height of each air spring 5. Based on output signals from the air spring height detection sensor 13, the controller 7 continuously ascertains the heights of the air springs 5 and accordingly the tilt angle of the vehicle body 2 from the detected heights of the air springs, to thereby actuate the tilt control valve 12 properly. As the air spring height detection sensor 13, a rotation angle sensor such as a resolver and an encoder may be employed.

When vehicle body tilting is carried out in such a railway vehicle 1, e.g. while traveling along a curve, the basic control operation is as described below. Based on track information of the curve, the controller 7 selects a suitable tilt angle θ for the vehicle body 2 from a database pre-installed in its memory, and actuates the tilt control valve 12 to allow the vehicle body 2 to be tilted by the predetermined suitable tilt angle θ.

Specifically, by the actuation of the tilt control valve 12 on the outer rail side, compressed air is introduced into the air spring 5 on the outer rail side from the air tank 6 through the pneumatic piping 11 (see the solid arrow in FIG. 1). This allows the height of the air spring 5 on the outer rail side (on the right side in FIG. 1), among the left and right air springs 5, to be increased so that it becomes higher than the air spring 5 on the inner rail side (on the left side in FIG. 1) to thereby allow the vehicle body 2 to be tilted by the predetermined tilt angle θ. In some instances, the tilt control valve 12 on the inner rail side may be actuated concurrently to allow air within the air spring 5 on the inner rail side to be discharged to the outside through the pneumatic piping 11 (see the dashed arrow in FIG. 1).

In this process, the controller 7 continuously acquires the output signals from the air spring height detection sensor 13 to detect the heights of the air springs 5, and accordingly ascertains the tilt angle of the vehicle body 2 from the detected heights of the air springs. Then, the controller 7 continuously actuates the tilt control valve 12 to supply and discharge compressed air to and from the air springs 5 in order to adjust the tilt angle of the vehicle body 2, which is continuously detected, to the predetermined suitable tilt angle θ. In this manner, the railway vehicle 1 can travel along a curve with its vehicle body 2 being tilted at the predetermined suitable tilt angle θ with respect to the bogie 3.

2. Method for control of vehicle body tilting The basic control of vehicle body tilting as described above can provide improved ride comfort because the vehicle body 2 is tilted by the predetermined suitable tilt angle θ when traveling along a curve. However, when the vehicle body tilting is carried out along consecutive curved sections, a significant amount of compressed air is consumed in the air tank 6. This causes an excessive decrease in the air tank pressure, which may lead to trouble with braking actuation of the railway vehicle 1. To address this problem, the method for control of vehicle body tilting of the present invention is applied to carry out the following control operation in addition to the above basic control operation.

Figure 2:
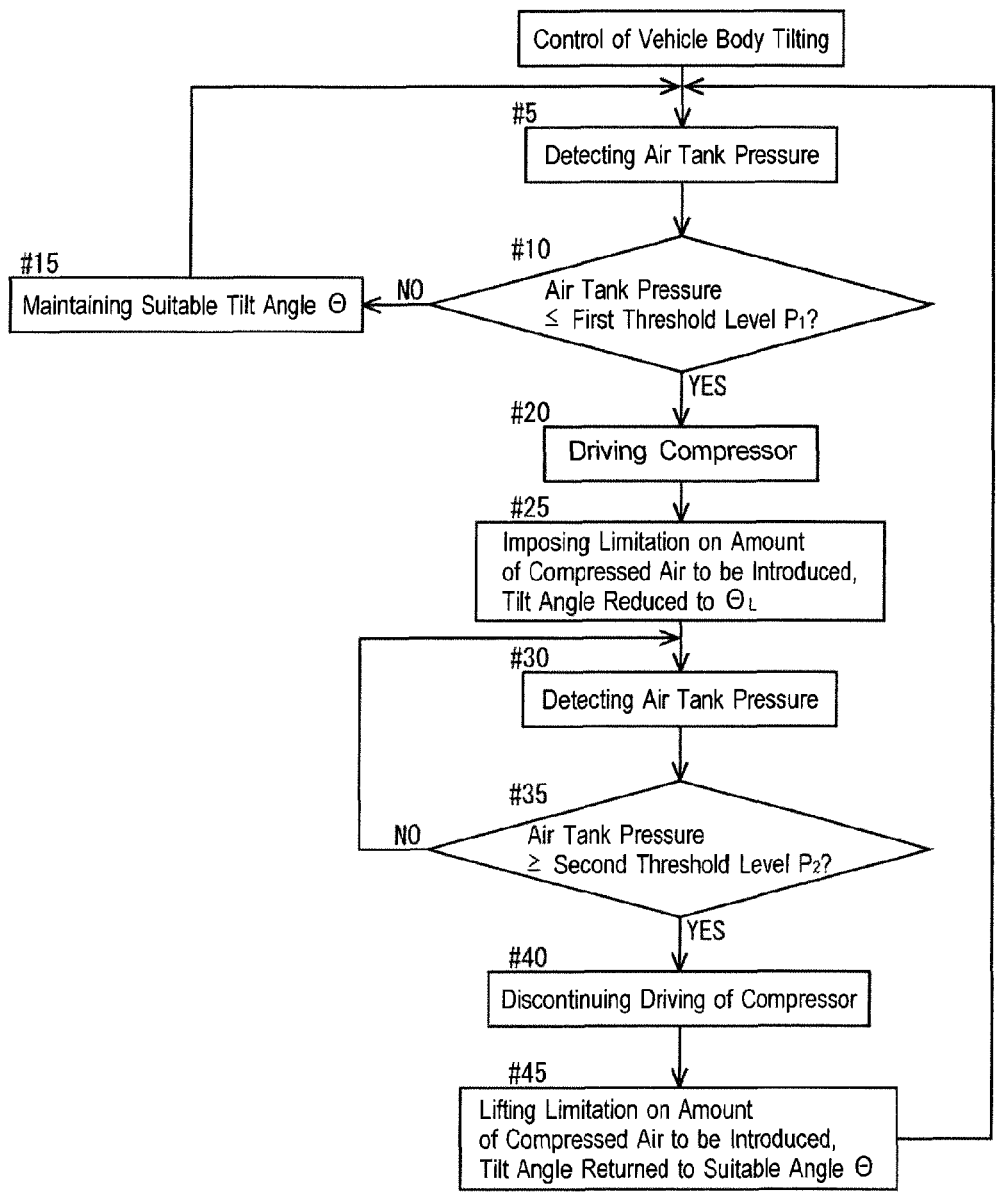
FIG. 2 is a flowchart illustrating a control operation in accordance with the method for control of vehicle body tilting of the present invention.

FIG. 2 is a flowchart illustrating a control operation in accordance with the method for control of vehicle body tilting of the present invention. While the railway vehicle 1 is traveling along a curve with its vehicle body 2 being tilted at the predetermined suitable tilt angle θ, the controller 7, at step #5, continuously acquires detected signals from the pressure gauge 9 provided for the air tank 6 to detect the air tank pressure. At subsequent step #10, the controller 7 continuously determines whether or not the air tank pressure is at or below the first threshold level $P_1$. During this process, in association with the vehicle body tilting by the predetermined suitable tilt angle θ, compressed air is introduced from the air tank 6 into the air springs 5 allowing the compressed air in the air tank 6 to be consumed, and thus the air tank pressure gradually decreases. It is to be noted that the first threshold level $P_1$ is set to a value at least equal to or higher than a minimum level required for braking actuation. The first threshold level $P_1$ is preinstalled in the memory of the controller 7.

If the air tank pressure is determined to be higher than the first threshold level $P_1$ at step #10, the process proceeds to step #15, at which the vehicle body 2 is maintained at the predetermined suitable tilt angle θ with no limitation imposed on the amount of compressed air to be introduced into the air springs 5. In this instance, the air tank pressure is above the first threshold level $P_1$, which indicates that the air tank pressure is ensured to be at a level equal to or higher than a minimum level required for braking actuation, and therefore no trouble occurs with braking actuation.

On the other hand, if the air tank pressure is determined to be equal to or lower than the first threshold level $P_1$ at step #10, the process proceeds to step #20 and step #25 to reduce the consumption of the compressed air and shift to a pressure restoration mode to restore the air tank pressure. That is, at step #20, the controller 7 drives the compressor 8 to supply compressed air to the air tank 6 in which pressure has been reduced.

Also, at step #25, the controller 7 continues to allow the introduction of compressed air from the air tank 6 into the air springs 5 but limits the introduction amount to or below the amount of compressed air to be supplied by the compressor 8, so as to reduce the tilt angle of the vehicle body 2 from the predetermined suitable tilt angle θ. The tilt angle of the vehicle body 2 decreases approximately in proportion to the reduction in the amount of compressed air introduced into the air springs 5. Specifically, the controller 7 selects, from the database pre-installed in its memory, a tilt angle $θ_L$ which is smaller than the predetermined suitable tilt angle θ in accordance with the pressure restoration mode, and actuates the tilt control valve 12 to allow the vehicle body 2 to be tilted by the tilt angle $θ_L$ of the pressure restoration mode. This allows reduction of consumption of the compressed air in association with the vehicle body tilting.

By shifting to such pressure restoration mode at step #20 and step #25, a deterioration in ride comfort can be inhibited because vehicle body tilting is carried out anyway although the tilt angle of the vehicle body 2 is reduced to the tilt angle $θ_L$ which is smaller than the predetermined suitable tilt angle θ. Moreover, while the consumption of the compressed air in association with the vehicle body tilting is reduced, a greater amount of compressed air than the consumed amount is supplied from the compressor 8 to the air tank 6. This ensures that the air tank pressure is at a level equal to or higher than a minimum level required for braking actuation, and thus no trouble occurs with braking actuation.

While continuing to impose a limitation on the amount of compressed air to be introduced into the air springs 5 in the pressure restoration mode, the controller 7, at step #30, continuously acquires detection signals from the pressure gauge 9 to detect the air tank pressure. At subsequent step #35, the controller 7 continuously determines whether or not the air tank pressure is at or above a second threshold level $P_2$. During this process, a greater amount of compressed air than the consumed amount is supplied to the air tank 6 with the supply of compressed air by the compressor 8, and thus the air tank pressure gradually increases. It is to be noted that the second threshold level $P_2$ is set to a value exceeding the first threshold level $P_1$. The second threshold level $P_2$ is also preinstalled in the memory of the controller 7.

If the air tank pressure is determined to be lower than the second threshold level $P_2$ at step #35, the pressure restoration mode is maintained as-is.

On the other hand, if the air tank pressure is determined to be equal to or higher than the second threshold level $P_2$ at step #35, the process proceeds to step #40 and step #45 to deactivate the pressure restoration mode. Specifically, the controller 7, at step #40, discontinues the driving of the compressor 8, and at the same time, at step #45, lifts the limitation on the amount of compressed air to be introduced into the air springs 5, to thereby allow the tilt angle of the vehicle body 2 to return to the predetermined suitable tilt angle θ. In this manner, the ride comfort can be improved again.

Then, the process returns to step #5 and repeats the above-described control operation. If the railway vehicle 1 passes through the curve during the above-described control operation, it is forcibly terminated.

3. First threshold level $P_1$ and second threshold level $P_2$

Set forth below are examples of the first threshold level $P_1$ and the second threshold level $P_2$ that can be employed in the method for control of vehicle body tilting of the present invention as described above. The first threshold level $P_1$ [kPa] as an absolute pressure may be specified by the equation (1) below, and the second threshold level $P_2$ [kPa] as an absolute pressure may be specified by the equation (2) below. Usually, the first threshold level $P_1$ is set to a value higher than the value given by the equation (1), and the second threshold level $P_2$ is set to a value higher than the value given by the equation (2).

$$P_1 = P_0 + γ \times Pm \times k \times A/V \times T \quad (1)$$

$$P_2 = P_0 + γ \times Pm \times k \times A/V \times T + γ \times Pm \times A/V \times T \quad (2)$$

where $P_0$: a minimum air tank pressure required for braking actuation [kPa],

γ: a polytropic index,

Pm: a mean value of the air tank pressure [kPa], k: a correction coefficient; <B/A, B: the amount of compressed air to be supplied from the compressor to the air tank [m³/s], A: the amount of compressed air to be introduced from the air tank into the air springs with no limitation imposed thereon [m³/s], V: volume of the air tank [m³], and T: time lag between a start of driving of the compressor and a start of discharge of compressed air [s].

The first threshold level $P_1$ expressed by the above equation (1) and the second threshold level $P_2$ expressed by the above equation (2) are values given in light of the actual performance characteristics of the compressor 8. That is, in the operation of the compressor 8, there is some time lag T between the start of the driving and the start of the steady supply of compressed air. During the time lag T, no compressed air is supplied to the air tank 6 and therefore compressed air in the air tank 6 is only consumed by the vehicle body tilting.

Thus, when specifying the first threshold level $P_1$, it is necessary to make sure that the air tank pressure does not fall below the minimum level required for braking actuation during the time lag T even though the consumption of the compressed air is reduced by the limitation imposed on the amount of compressed air to be introduced after shifting to the pressure restoration mode on the basis of the threshold level $P_1$. In view of this, the equation (1), by the second term ($\gamma \times Pm \times k \times A/V \times T$), factors in the consumption of the compressed air during the time lag T with the limited introduction of compressed air. The mean value Pm of the air tank pressure is appropriately specified in light of the normal usage state of the air tank pressure.

Also, when specifying the second threshold level $P_2$, it is necessary to avoid reverting to the pressure restoration mode immediately after the deactivation of the pressure restoration mode. This is because, on the basis of the second threshold level $P_2$, the pressure restoration mode is deactivated and the compressor 8 is stopped while the consumption of the compressed air is increased with no limitation imposed on the amount of its introduction. In view of this, the equation (2), by the third term ($\gamma \times Pm \times A/V \times T$), factors in the consumption of the compressed air during the time lag T with the unlimited introduction of compressed air.

It is noted that the second threshold level $P_2$ expressed by the equation (2) may also be expressed by the equation (3) below by substituting the equation (1) into the equation (2):

$$P_2 = P_1 + \gamma \times Pm \times A/V \times T \qquad (3)$$

For the polytropic index $\gamma$ in the equations (1) and (2), a value of up to 1.4 is employed. Also, the correction coefficient k may be set to any value provided that it satisfies the condition of being equal to or smaller than B/A ($\leq$B/A).

Specific examples of the first threshold level $P_1$ given by the equation (1) and the second threshold level $P_2$ given by the equation (2) (equation (3)) are set forth below.

Assuming that the discharge rate of the compressor is 1600 [NL/min] and the mean value of the air tank pressure as a gauge pressure is 800 [kPa] in a railway vehicle equipped with one compressor per two vehicles, the amount B of compressed air to be supplied from the compressor to the air tank is as follows:

$$B = 1600/2/60 \times 101.3/(800+101.3) \approx 1.5 \text{ [L/s]} = 1.5 \times 10^{-3} \text{ [m}^3\text{/s]}.$$

Assuming that the vehicle body tilting device is capable of supplying air to the air springs at a rate of 1500 [NL/min], the amount A of compressed air to be introduced from the air tank into the air springs with no limitation imposed thereon is as follows:

$$A = 1500/60 \times 101.3/(800+101.3) \approx 2.8 \text{ [L/s]} = 2.8 \times 10^{-3} \text{ [m}^3\text{/s]}.$$

Consequently, B/A is found to be 0.54. Accordingly, the correction coefficient k is set to a value equal to or smaller than 0.54, e.g., 0.5.

Then, assuming that the volume V of the air tank is 300 [L], the time lag T of the compressor operation is 10 [s], the minimum air tank pressure $P_0$ required for braking actuation is 590 [kPa], and the polytropic index $\gamma$ is set to 1.4, the first threshold level $P_1$ is as follows in accordance with the equation (1):

$$P_1 = 590 + 1.4 \times (800+101.3) \times 0.5 \times 2.8/300 \times 10 = 590 + 59 = 649 \text{ [kPa]}.$$

Also, the second threshold level $P_2$ is as follows in accordance with the equation (3) (equation (2)):

$$P_2 = 649 + 1.4 \times (800+101.3) \times 2.8/300 \times 10 = 649 + 118 = 767 \text{ [kPa]}$$

Industrial Applicability

As discussed in the foregoing, according to the method for control of vehicle body tilting of a railway vehicle of the present invention, even when the air tank pressure falls to or below a prescribed level while traveling along a curve, a deterioration in ride comfort can be inhibited. Moreover, the air tank pressure can be ensured to be at a level equal to or higher than a minimum level required for braking actuation and thus no trouble occurs with braking actuation.

What is claimed is:

1. A method for control of vehicle body tilting of a railway vehicle to tilt a vehicle body by introducing compressed air from an air tank into a pair of left and right air springs supporting the vehicle body on a bogie when the railway vehicle travels along a curve, the method comprising:
   detecting pressure of compressed air in the air tank;
   driving a compressor that supplies compressed air to the air tank when detecting a pressure drop in the air tank to or below a first threshold level in association with introduction of compressed air into the air springs; and
   limiting an amount of compressed air to be introduced from the air tank into the air springs to a level equal to or lower than an amount of compressed air to be supplied from the compressor to the air tank while continuing the introduction from the air tank into the air springs so as to ensure that the air tank pressure is maintained at a level equal to or higher than a minimum level required for braking actuation of the railway vehicle.

2. The method for control of vehicle body tilting of a railway vehicle according to claim 1, wherein the first threshold level $P_1$ as an absolute pressure is specified by the equation (1):

$$P_1 = P_0 + \gamma \times Pm \times k \times A/V \times T \qquad (1)$$

where $P_0$: a minimum air tank pressure required for braking actuation [kPa],
$\gamma$: a polytropic index,
Pm: a mean value of the air tank pressure [kPa],
k: a correction coefficient; <B/A,
B: the amount of compressed air to be supplied from the compressor to the air tank [m$^3$/s],
A: the amount of compressed air to be introduced from the air tank into the air springs with no limitation imposed thereon [m$^3$/s],
V: volume of the air tank [m$^3$], and
T: time lag between a start of driving of the compressor and a start of discharge of compressed air [s].

3. The method for control of vehicle body tilting of a railway vehicle according to claim 1, wherein the method includes: discontinuing the driving of the compressor when detecting a pressure increase in the air tank to or above a second threshold level, which is greater than the first threshold level, in association with the supply of compressed air by the compressor while imposing a limitation on the amount of compressed air to be introduced into the air springs; and lifting the limitation on the amount of compressed air to be introduced to the air springs.

4. The method for control of vehicle body tilting of a railway vehicle according to claim 3, wherein the second threshold level $P_2$ as an absolute pressure is specified by the equation (2):

$$P_2 = P_0 + \gamma \times Pm \times k \times A/V \times T + \gamma + Pm \times A/V \times T \qquad (2)$$

where
$P_0$: a minimum air tank pressure required for braking actuation [kPa],
$\gamma$: a polytropic index,
$Pm$: a mean value of the air tank pressure [kPa],
$k$: a correction coefficient; $<B/A$,
$B$: the amount of compressed air to be supplied from the compressor to the air tank [m$^3$/s],
$A$: the amount of compressed air to be introduced from the air tank into the air springs with no limitation imposed thereon [m$^3$/s],
$V$: volume of the air tank [m$^3$], and
$T$: time lag between a start of driving of the compressor and a start of discharge of compressed air [s].

5. The method for control of vehicle body tilting of a railway vehicle according to claim 2, wherein the method includes: discontinuing the driving of the compressor when detecting a pressure increase in the air tank to or above a second threshold level, which is greater than the first threshold level, in association with the supply of compressed air by the compressor while imposing a limitation on the amount of compressed air to be introduced into the air springs; and lifting the limitation on the amount of compressed air to be introduced to the air springs.

6. The method for control of vehicle body tilting of a railway vehicle according to claim 5, wherein the second threshold level $P_2$ as an absolute pressure is specified by the equation (2):

$$P_2 = P_0 + \gamma \times Pm \times k \times A/V \times T + \gamma \times Pm \times A/V \times T \qquad (2)$$

where
$P_0$: a minimum air tank pressure required for braking actuation [kPa],
$\gamma$: a polytropic index,
$Pm$: a mean value of the air tank pressure [kPa],
$k$: a correction coefficient; $<B/A$,
$B$: the amount of compressed air to be supplied from the compressor to the air tank [m$^3$/s],
$A$: the amount of compressed air to be introduced from the air tank into the air springs with no limitation imposed thereon [m$^3$/s],
$V$: volume of the air tank [m$^3$], and
$T$: time lag between a start of driving of the compressor and a start of discharge of compressed air [s].

\* \* \* \* \*